INVENTOR.
ALVA L. McCOY

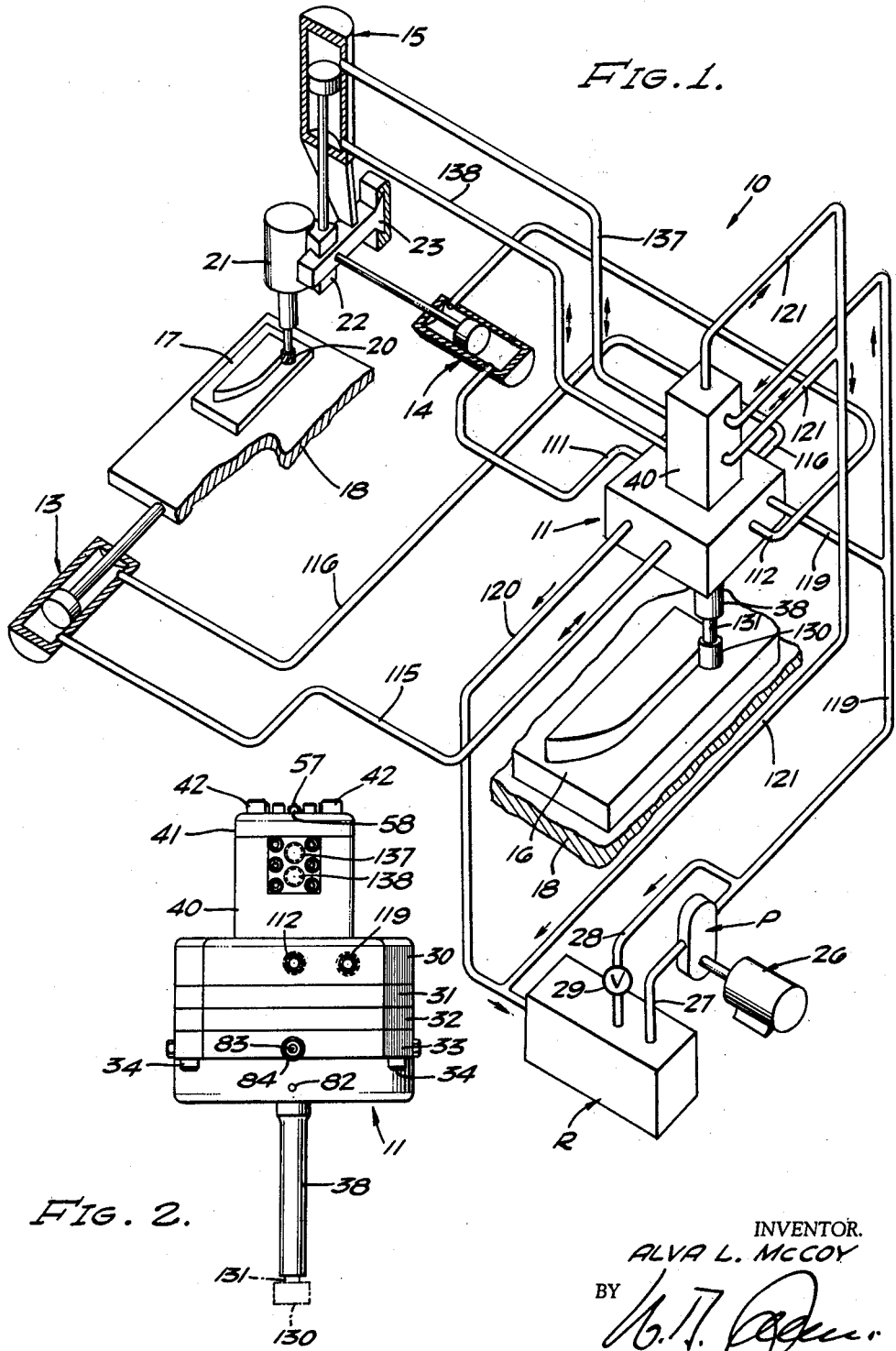

Sept. 15, 1964            A. L. McCOY            3,148,594
HYDRAULIC CONTROL MECHANISM FOR THREE-DIMENSIONAL TRACERS
Filed April 1, 1958            3 Sheets-Sheet 3
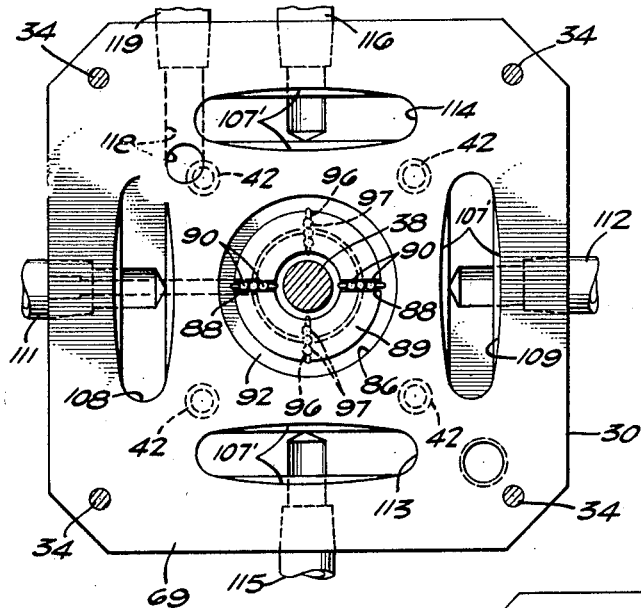
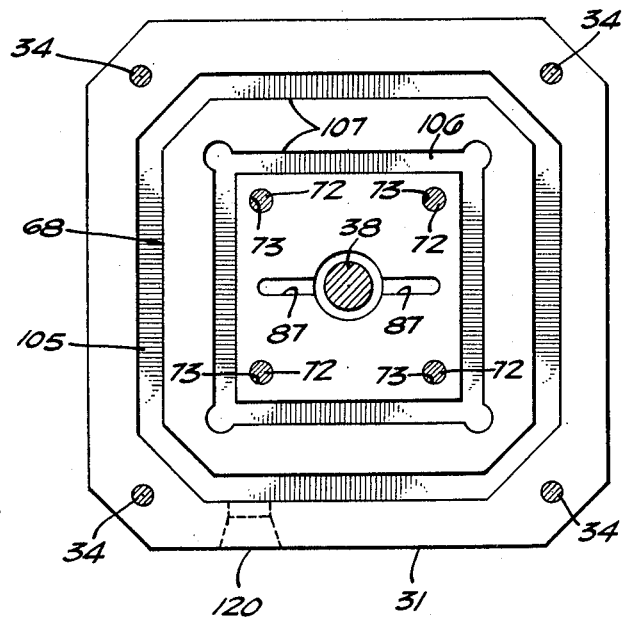
INVENTOR.
ALVA L. McCOY

United States Patent Office 3,148,594
Patented Sept. 15, 1964

3,148,594
HYDRAULIC CONTROL MECHANISM FOR
THREE-DIMENSIONAL TRACERS
Alva L. McCoy, Alhambra, Calif., assignor, by mesne assignments, to Young Spring & Wire Corporation, Detroit, Mich., a corporation of Michigan
Filed Apr. 1, 1958, Ser. No. 725,604
24 Claims. (Cl. 91—413)

This invention relates to hydraulic control mechanisms and more particularly to an improved hydraulic servo-mechanism in which the slightest movement of a single master control is about any one of three axes at right angles to one another can be faithfully transmitted to a remote point and there faithfully reproduced by the aid of three associated slave servo-motors. Although the invention is here shown utilized as a three-dimensional tracer, it is pointed out that the principles of the invention are applicable to servo-circuits generally and in a wide variety of arrangements.

With reference to three-dimensional tracers as used to control automatically a machine tool to machine a given workpiece precisely to the shape of a master pattern, numerous problems are encountered for which prior devices do not provide a satisfactory solution. For example, it is common practice to use a master control having a movable control stylus manually held in contact with the master pattern and advanced over the surface thereof at a suitable rate of feed. This stylus is movable axially of itself to sense and transmit information of variations in surface height as the stylus is advanced over the pattern. Likewise, lateral movements of the stylus in any direction away from its neutral vertical position are utilized to sense and transmit instructions relative to variations in the pattern laterally of the neutral axis of the stylus.

Unfortunately, however, errors are involved in such prior devices owing to the fact these are so constructed that the stylus in sensing lateral deviations from the neutral position is required to tilt about some point along its axis. The pivoting of the stylus away from its neutral position changes the elevation of the sensing rim edge of the stylus with respect to the master pattern. For example, let it be assumed that the stylus is moving along a curved edge all parts of which lie in a truly accurate horizontal surface. As the stylus is moved laterally to follow the vertical side of a flange upstanding from this horizontal surface, the sensing edge of the stylus will be elevated due to the pivotal movement of the stylus about its own pivot point. In consequence, the stylus will fall by that amount so that its contacting edge will remain in contact with its horizontal surface. This axial movement of the stylus will cause the vertical movement sensing valve to transmit a signal to the vertical servo-motor causing the latter to be lowered and gouge out a slight depression in the surface of the workpiece when in fact no change in the height of the cutting tool is desired or necessary. Corresponding but lesser errors are also introduced into the master control with respect to the lateral motion sensing circuits with resultant errors in other than horizontal surfaces of the workpiece.

Still another serious shortcoming of prior tracer servo-mechanisms is that the valve ports do not have adequate provision for feathering both the opening and closing of the ports as the stylus approaches or departs from its neutral position. In consequence, the initiation and cessation of fluid flow is so abrupt as to introduce objectionable shock and vibration in both the fluid control circuits and in the equipment and results in the hunting or overrunning of the control operations further aggravating the non-uniform and erratic control impulses. The net result produced is an uneven and wavy surface lacking in conformity with the surface contour of the master pattern. Additionally, the equipment and control mechanism is subjected to vibration and shock treatment so undesirable and intolerable in precision operations.

Another feature of the invention is the provision of a master control construction entirely lacking in looseness or play between the parts yet wherein the few movable components are freely and smoothly movable despite high fluid pressures acting on certain areas thereof. Moreover, the design of the components is such that their movement does not modify the pressure differential in a manner to add to or detract from the slight force required to move the components. Both a satisfactory mode of supporting moving components for free movement and the design thereof in a manner to isolate the moving parts from changing pressure differentials has been a serious problem for which satisfactory solutions have not been provided prior to this invention.

Accordingly, it is a primary object of the present invention to provide a servo-mechanism utilizing a hydraulic power transmitting network and featuring an improved master control unit accurately responsive to the slightest movement.

Another object of the invention is the provision of an improved master control unit for use in a hydraulic servo-mechanism.

Another object of the invention is the provision of a master control valve having three pairs of fluid ports arranged at right angles to one another and in which two movable valve members are controlled by a common actuator.

Another object of the invention is the provision of a master control valve for a servo-mechanism having a single movable valve member controlling two sets of fluid ports at right angles to one another by movement of the valve member in a single predetermined plane and including anti-friction bearing means cooperating therewith to prevent all rotary movement of the plate while leaving the valve free for movement in any straight line direction within said plane.

Another object of the invention is the provision of a fluid control valve employing a spool type movable valve element in cooperation with a plurality of fluid ports lying in parallel planes tilted slightly with respect to a plane normal to the spool axis.

Another object of the invention is the provision of a spool valve adapted to control a fluid actuated servo-motor and featuring control ports arranged about the circumference of the spool in such manner that fluid flow is initiated and arrested gradually near full cut-off.

Another object of the invention is the provision of a fluid control valve having a control valve element supported for movement in a plane and including self-aligning support bearing means therefor.

Another object of the invention is the provision of a three-dimensional tracer mechanism for use on machine tools and the like and featuring a master valve having a stylus actuator arranged to control two valve elements, one of which is confined to movement in a single plane to control two pairs of ports at right angles to one another and in a plane normal to the actuator axis and the second of which is movable axially of the stylus.

Another object of the invention is the provision of a three-dimensional tracer mechanism for use on machine tools and operable to cause the cutting tool to reproduce the surface of the master pattern in a workpiece undergoing machining faithfully and free of surface irregularities not present in the pattern.

Another object of the invention is the provision of a three-dimensional tracer valve mechanism having a valve responsive to changes in elevation in the surface contour of a master pattern in conjunction with other valve control means responsive to contour changes in a horizontal plane of the pattern, and further characterized in that the first-named valve means can be used, or replaced with a cap, at the option of the user or purchaser.

These and other more specific objects will appear upon reading the following specification and claims and upon considering in connection therewith the attached drawings to which they relate.

Referring now to the drawings in which a preferred embodiment of the invention is illustrated:

FIGURE 1 is a schematic view in perspective showing the master control valve connected in circuit with three servo-motors having axes of movement at right angles to one another and arranged to control a machine tool cutter in the faithful reproduction of a master pattern in a workpiece undergoing machining;

FIGURE 2 is an elevational view from one side of the master control valve unit;

FIGURE 4 is a transverse sectional view on a reduced scale taken on line 4—4 and looking into the two pairs of fluid ports;

FIGURE 5 is a transverse view taken on a reduced scale taken on the same plane as FIGURE 4 but looking in the opposite direction as is indicated by line 5—5 of FIGURE 3.

Figure 3:
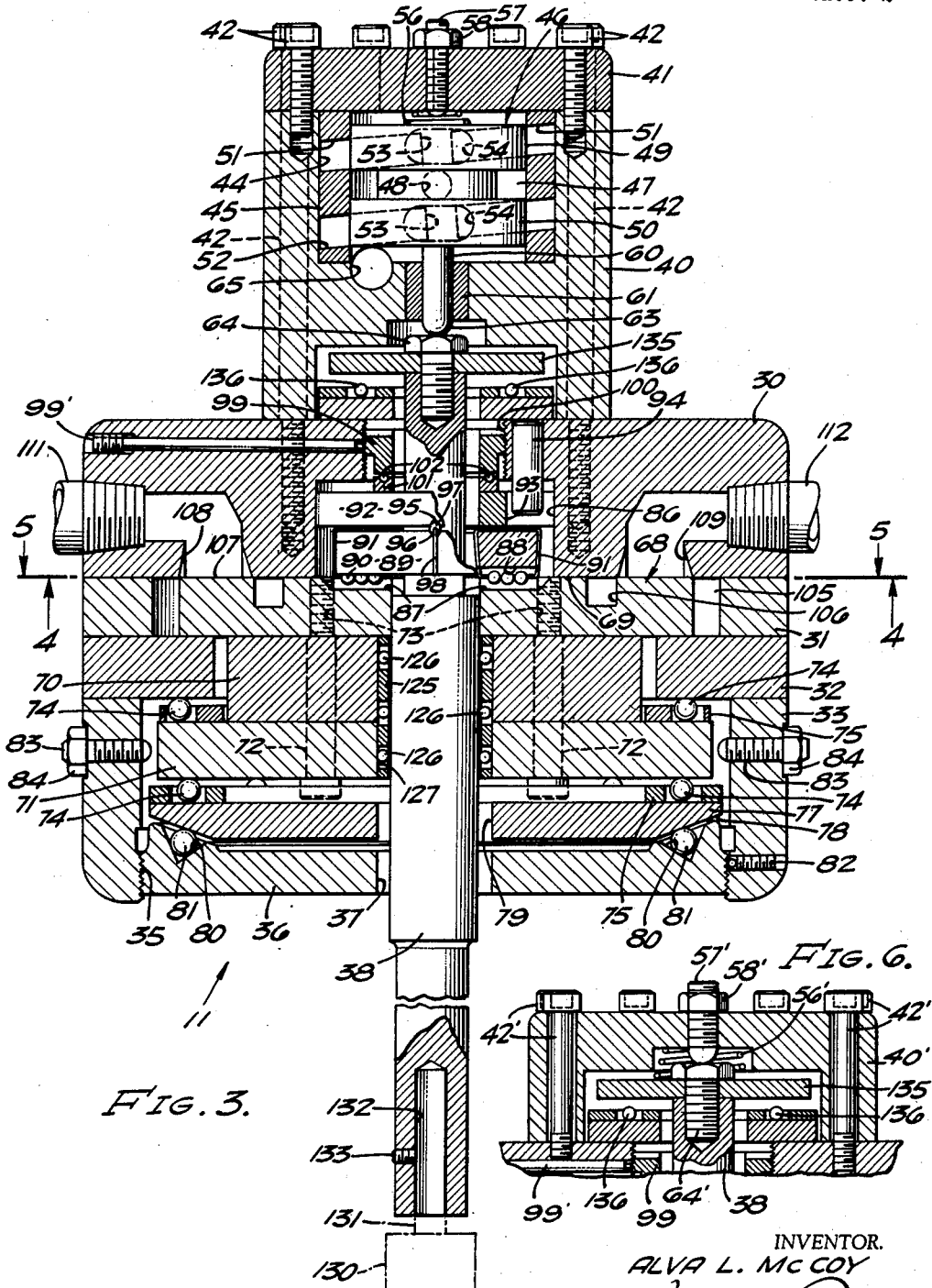
FIGURE 3 is a longitudinal sectional view through the master valve unit centrally thereof.
Figure 6:
FIGURE 6 is a fragmentary longitudinal sectional view showing the spool valve assembly replaced with a closure cap.

In the illustrated application of the servo-mechanism illustrated in FIGURE 1 and designated generally 10, the master control valve 11 is utilized as a three-dimensional tracer and is operatively connected in circuit with slave servo-motors 13, 14 and 15. In this application of the invention, the master control valve is used as a tracer element to follow a master pattern 16 which it is desired to reproduce in a workpiece 17, both the pattern and the workpiece being similarly oriented and rigidly clamped to the movable bed plate 18 of a machine tool. This bed plate is arranged to be driven to-and-fro by servo-motor 13 to shift the workpiece longitudinally beneath a rotary cutter tool 20 mounted in a motor 21. Motor 21 is rigidly supported in accurately machined guideways diagrammatically indicated at 22 and 23 movably supported by the frame of the machine tool. Servo-motor 15 is attached to slide 22 supporting tool motor 21 and is operative to shift the motor and the attached cutting tool 20 axially whereas servo-motor 14 is connected to drive slide 23 and is operable to shift motor 21 at right angles to and across the paths of motors 13 and 15. Likewise, it will be understood that the direction of movement of motors 14 and 15 is at right angles to the path of movement of motor 13.

Interconnecting these servo-motors and the master control valve are a series of hydraulic fluid lines connected in circuit with a pump P driven by a motor 26 and having its inlet in communication with a fluid reservoir R through a conduit 27. Excess fluid is returned to the reservoir through a bypass line 28 having an automatic pressure relief valve 29 therein set to open when the pressure exceeds a predetermined operating pressure. Further details of the fluid connections will be referred to below following a description of the valve details.

Referring now to FIGURES 3 to 5, the master valve 11 is shown as having a cup-shaped main housing formed by a bottom plate 30 and a side wall formed by rings 31, 32, 33 held tightly clamped to bottom plate 30 by cap screws 34 (FIGURE 2). The inner lip edge of ring 33 is threaded as indicated at 35 and adjustably supports a cover 36 having a central bore 37 through which extends a valve actuating spindle 38 movably supported interiorly of the valve in the manner to be described presently. Superimposed on the exterior of bottom plate 30 of the main housing is a smaller housing 40 for a spool valve 46 housing 40 and cap 41 therefor being held securely assembled to bottom plate 30 by cap screws 42.

Seated within a well 44 of housing 40 is a unitary sleeve 45 the inner bore of which has a close sliding fit with spool valve 46. This valve and its structural and functional relationship to sleeve 46 forms an important feature of the invention in that these components are designed to provide a graduated or finely feathered initiation and cut-off of fluid flow as the spool 46 moves into and out of its neutral position in which position the fluid ports controlled thereby are barely but definitely closed. Encircling spool 46 centrally thereof is an annular fluid distributing groove 47 to which pressurized fluid is supplied through a passage 48 opening laterally through the side of housing 40. To either side of distributing groove 47 are flow control lands 49 and 50 effective to control the flow of fluid into and out of slotted passages 51 and 52 formed through sleeve 45 in such manner that a medium plane through these passages transversely of sleeve 45 lies at a small angle to a plane normal to the sleeve axis. As is made clear by FIGURE 3, the axial width of passages 51 and 52 will be understood as being appreciably less than the axial width of lands 49 and 50. The inclination of these passages and the width thereof relative to the width of the associated lands 49 and 50 is determined to a high degree of precision to the end that, in the neutral position of spool 46, the opposite face edges of the lands will just bridge and close the passages. In this position of spool valve 46 and sleeve 45, illustrated in FIGURE 3, it is pointed out that no pressurized fluid from groove 47 can enter either passage 51 or passage 52, nor can the fluid normally filling these passages flow past the opposite end faces of the spool valve for return to fluid reservoir R through return conduits 121.

Owing to the slight inclination of passages 51 and 52, it will be understood that the slightest movement of the spool to either side of the closed position will move lands 49 and 50 out of full registry with the passages 51 and 52 thereby initially opening these passages along a portion only of the circumferential extent of the passages. This contrasts sharply with prior spool valve designs in which the fluid ports controlled by the valve lands are located in planes normal to the valve axis with the result that the passages open along their entire circumferential extent upon movement of the spool rather than along a small portion of their length as is true with respect to the present design. It will therefore be recognized that the opening and closing of ports 51 and 52 occurs very gradually and this is particularly emphasized at the very beginning and the very end of flow. In other words, the feathering of flow occurs in a distinctly nonlinear manner for the purpose of preventing sudden changes in flow rates at the start and termination of flow.

Another important feature of the spool valve construction is the design of passages 51 and 52 in sleeve 45 in such manner that they do not extend entirely around the sleeve but instead include two halves having their adjacent ends separated from one another by a pair of short walls 53 integral with sleeve 45. Walls 53 are diametrically disposed on opposite sides of the sleeve at points midway between the high and low points of passages 51, 52 axially of the sleeve, as is made clear by FIGURE 3. This arrangement enables the ports to be formed economically with precision by milling cutters and with all parts of the sleeve accurately oriented. Stated differently, if the rings and spacers constituting sleeve 45 were formed in separate parts, difficult tolerance problems would be involved and special precautions would be required to hold the various rings and spacers properly assembled in a desired orientation.

The fluid supply ports for passages 51 and 52 terminate in elliptical openings 54 bridging the connecting walls 53 of the sleeve and serve to convey fluid to and from the fluid control passages 51, 52 as permitted by the position of the spool valve. Biasing the spool valve in one direction is a depression spring 56 interposed between end cap 41 and the upper end of this valve. Extending centrally through the spring is an adjustable stop screw 57 adapted to be locked in a desired position by a lock nut 58. Integral with the lower end of the spool 46 is a guide stud 60 extending through a bushing 61 mounted in an axial bore of housing 40 and having its accurately rounded and finished lower end 63 bearing on the flat head of a cap screw 64 secured in the upper end of spindle 38. The opposite ends of the spool valve are connected with waste fluid venting passages 65 opening into return conduits 121 leading to fluid reservoir R.

Referring now to the main valve housing, there is located interiorly thereof a generally square plate 68 forming the second movable valve element of the master control unit. Valve 68 is illustrated from its top surface in FIGURE 5 and it is pointed out that it has a thickness slightly less than the juxtaposed surrounding ring 31, and the two faces of the valve are accurately ground to lie in parallel planes with the upper surface flush against the accurately ground surface 69 forming the bottom surface of housing wall 30. It will be observed from FIGURE 3 that housing ring 32 has its inner periphery underlying the rim edge of valve 68 and provides a back stop underlying the lower surface of the valve plate. Actually, the valve plate does not rest against the upper surface of ring 32 owing to the supporting action of anti-friction thrust bearings to be described presently.

Secured to the under surface of valve 68 is a spacer plate 70 and a thrust bearing plate 71 of appreciably greater face area, plates 70 and 71 being secured to valve plate 68 as by cap screws 72 having their threaded ends seated in threaded bores 73 of valve 68. The upper and lower rim surfaces of plate 71 form bearing surfaces against which anti-friction balls 74 rest and are held captive within the openings of a bearing cage ring 75. The upper ring of balls 74 bears against the under surface of housing ring 32 while the lower set of balls 74 rides on a self-aligning thrust bearing plate 77 having a lower surface 78 at its outer rim of spherical shape about a center lying on the axis of spindle 38 near its upper end. The self-aligning plate 77 has a large diameter central bore 79 surrounding spindle 38 and affording ample clearance with respect thereto for the self-aligning action of both the spindle and the thrust bearing.

The described thrust bearing assembly is held assembled within the valve housing by a cover disc 36 the rim of which is threaded to mate with threads 35 in housing ring 33. The interior surface of cover 36 is provided with a plurality of conical recesses 80 distributed about its periphery and seating ball bearings 81, preferably being three of these recesses and balls uniformly spaced about the rim of the cover with the balls in supporting contact with spherical surface 78 of plate 77.

From the foregoing description of the bearing support for valve plate 68, it will be apparent that this valve is firmly supported on two rings of anti-friction thrust bearing elements located on either side of rigid plate 71 and that this bearing assembly is held normally under a preloaded condition by the self-aligning plate 77 and the three balls 81. Although two of the three self-aligning ball bearings are shown in FIGURE 3, it will be understood this is for purposes of clarity of illustration and that, in reality, these balls are spaced 120 degrees apart circumferentially of cover 36. It remains to call attention to the set screw 82 in the side of the valve housing by which cover 36 may be anchored after rotation to a position placing the thrust bearings under a desired preload stress. It will also be noted that the valve assembly and its supporting bearings are restricted to relatively small lateral movement crosswise of the housing by adjustable stop screws 83 and lock nut 84.

Another important feature of the invention concerns the thrust bearing assembly housed within a well 86 formed in bottom wall 30 of the valve housing. An essential purpose of this bearing assembly is to permit unrestrained movement of valve 68 in any straight line direction while preventing even the slightest rotation of the valve about the axis of spindle 38. Additionally and importantly, the assembly provides anti-friction support for the upper side of the valve plate. In the illustrated structure, these objectives are accomplished by means of V-shaped grooves 87 formed in the upper surface of plate 68 and cooperating with similar grooves 88 on the lower side of bearing ring 89 in supporting anti-friction balls 90, these balls being held captive within grooves 87 and 88 by the inturned ends of a U-shaped guard or keeper encircling bearing ring 89 radially thereof. Overlying bearing ring 89 is a second ring 92 having its rim notched at 93 to fit about a stop pin 94 firmly anchored in a bore of housing bottom 30. Ring 92 has a pair of aligned grooves 95 overlying a similar pair of grooves 96 in the top surface of bearing ring 89 and cooperate therewith to seat balls 97 corresponding to balls 90 and simulary held in their load grooves 95 and 96 by U-shaped keepers 98 corresponding to keepers 91. It will be understood that the upper row of ball bearings 95 are disposed in grooves extending precisely at right angles to balls 90 and cooperate with one another to permit valve plate 68 to move in any straight line direction while preventing any arcuate movement thereof.

The described two rows of thrust bearings arranged at right angles to one another are maintained under a desired preload by means of a ring 99 having threaded support in a threaded bore 100 centrally of housing end wall 30. Underlying the lower edge of ring 99 is a ring 101 fixed to the upper side of ring 92 and having conical recesses in its upper surface seating three ball bearings 102. It will be understood that collar 99 may be provided with slots on its outer end for engagement with a spanner wrench for adjustment of the collar relative to threads 100 as necessary to preload the ball bearings 90 and 97 and to support the valve plate with its upper surface in fluid sealing contact with bottom surface 69 of the valve housing. Accordingly, collar 99 is adjusted in cooperation with cover 36 to load all ball bearings to the extent desired and to support the valve plate for smooth fluid sealing operation crosswise of the control ports, the construction and location of which ports will now be described.

Referring to FIGURES 4 and 5, it is pointed out that FIGURE 4 is a view looking toward the interior bottom surface 69 of end wall 30 of the valve housing, whereas FIGURE 5 is a view on the same plane but looking downwardly against the upper face of valve plate 68. Referring first to FIGURE 5, it will be observed that the valve plate 68 is generally square but has its corners cut away to conform with the similarly formed interior corners of housing ring 31. The juxtaposed walls of ring 31 and valve 68 are spaced apart to provide a channel 105 surrounding the valve plate within which the valve plate may be maneuvered to control the flow of fluid through the overlying pairs of flow control ports. Cut into the upper surface of valve 68 is a continuous pressurized fluid distributing groove 106 having its outer side wall accurately spaced parallel to the outer side of the plate to provide a flow control land 107 of the same width along each side of the valve. The pairs of lands on diametrically opposed sides of the valve plate are parallel to one another and at right angles to the lands to either side thereof.

Referring now to FIGURE 4, it will be understood that when the valve plate is in its neutral position lands 107 of the valve plate are exactly under and bridge the minor axis or width 107' of the overlying fluid ports. One pair 108, 109 of these ports is connected to control servo-motor 14 through conduits 111 and 112 respectively, whereas the other pair of ports 113 and 114 are connected to control servo-motor 13 through conduits 115 and 116, respectively. Each of the four ports 108, 109, 113 and 114 is identical and elliptical in shape as is best shown in FIGURE 4. The major axes of ports 108, 109 are equally spaced from the axis of the spindle 38 and lie parallel to one another and at right angles to the major axes of the other pair of ports 113, 114 which are similarly disposed with respect to the spindle axis. Accordingly, when the spindle axis is exactly centered between the four ports, it will be recognized that land 107 barely bridges the minor axis of each of the four ports and seals them against any fluid flow. However, should valve 68 be moved in any direction from this neutral position, even by the smallest amount, at least one pair of ports will be opened to permit flow of pressurized fluid into one port from supply groove 106 and an equal flow of fluid out of the other port into drainage passage 105 surrounding the valve plate. If the movement of the spindle is in a plane parallel to the major axes of one pair of ports, then the described flow will take place only through the other pair of the ports. However, if the movement of the spindle is in any direction not parallel to the major axes of one pair of ports, some flow will occur through all four ports and in an amount proportional to the magnitude and direction of spindle movement from its neutral position. Owing to the elliptical shape of each of the four ports, it will be clear that as land 107 approaches or recedes from the fully closed position of the port the flow therethrough will be graduated in a variable amount to feather the flow and avoid the highly objectionable overrun and shock conditions in the hydraulic circuit referred to hereinabove.

Distributing groove 106 is supplied with pressurized fluid through a passage 118 located in the valve housing end wall 30 connected with a conduit 119 leading to the discharge side of pump P. Fluid exhausting to drainage passage 105 is bled into return fluid conduit 120 terminating in fluid reservoir R. A branch 121 of this return fluid conduit has a forked end leading to the upper and lower ends of well 44 in the auxiliary valve housing 40 to drain fluid from the opposite ends of the spool valve back to the reservoir.

There remains to be described the bearing structure for spindle 38. This bearing is best shown in FIGURE 3 as comprising a cylindrical cage 125 surrounding the central portion of the spindle and having spaces therein supporting three rings of ball bearings 126 interposed between the cylindrical surface of the spindle and bore 127 through spacer disc 70 and bearing disc 71. No bearings are shown between the spindle and a central bore through valve plate 68, it being understood that this valve plate is rigidly clamped to the bearing rings 70 and 71 by cap screws 72 after the valve plate has been accurately centered with respect to the spindle axis. Bearings 126 are preferably pre-loaded to eliminate the possibility of lost motion radially of the assembly yet permitting the spindle to be moved freely axially thereof and crosswise of the valve plate assembly.

Normally, the lower end of the spindle has clamped therein a precision stylus 130 having the identical size and shape of cutter tool 20 chucked within the machine tool, the mounting of the stylus being facilitated by a shank 131 seated in a well 132 of spindle 38 and a clamping set screw 133. The adjustment of the described components is made such that when the lower rim edge of pilot 130 is seated on pattern 16, spindle 38 is supported in a slightly elevated position with stop disc 135 secured to its upper end by cap screw 64 out of contact with thrust bearings 136 and with lands 49 and 50 of spool valve 46 exactly bridging fluid passages 51 and 52, respectively. Under these conditions no fluid flow can take place through conduits 137 and 138 connected to ports 51 and 52, respectively, associated with and controlled by the spool valve. Under normal operating conditions it will be recognized that stop disc 135 is out of contact with bearings 136. However, when there is no pattern beneath the lower end of the spindle or when stylus 130 is being changed or adjusted, disc 135 and bearings 136 serve to support the spindle and as a safeguard against its escape from its assembled position within the valve housing.

When it is desired to use the master control valve only for two dimensional work there is no need for the spool valve sub-assembly and this unit may be detached from the master valve by removing cap screws 42 and a cup-shaped cap 40' substituted in its place by shorter cap screws 42'. Under these circumstances spring 56' surrounds the upper end of cap screw 64' and bears directly against stop plate 135. Also stop screw 57' then rests against the top of cap screw 64' to limit upward movement of the spindle. Otherwise, the spindle is supported by the pattern or by thrust bearings 136 depending upon whether the pattern underlies the lower end of the spindle. From the foregoing it will be recognized that the master control valve may be quickly and easily converted between two and three dimensional operations by the simple expedient of substituting spool housing 40 and cap housing 40' for one another and making the necessary changes in the pipe connections to the vertical axis servo-motor 15. By this expedient it is feasible for the purchaser to start with a two dimensional control and add the three dimensional capability at a later date merely by replacing cap 40' with the spool valve housing sub-assembly and adding the connections for an additional servo-motor.

In the use of the described master control valve as a tracer in a three dimensional machining operation as suggested in FIGURE 1, it will be understood that the master control unit 11 is rigidly connected for movement with cutting tool 20. This mounting may comprise a rigid supporting arm fixed to the motor housing as, for example, in the manner fully disclosed in my copending application for United States Letters Patent Serial No. 658,720, filed May 13, 1957, now Patent No. 3,008,456, for Tracer Valve. Accordingly, it will be clear that the master control unit is rigidly fixed relative to the support for the cutting tool for movement along therewith. It is also pointed out that bed plate 18 for the machine tool has rigidly fixed to its upper surface the master pattern 16 as well as the workpiece 17, to be machined, care being taken that these are similarly oriented relative to one another before being clamped to bed plate 18. When so disposed, the application of pressure to stylus 130 as required to advance the same along the pattern is effective to control the two movable valve elements, namely, plate valve 68 and spool valve 46 and the connected slave servo-motors 13, 14 and 15 to move the cutting tool 20 in precise unison therewith.

After the control has been set up and properly adjusted and the requisite adjustments have been made, the operator starts the hydraulic pump P in operation by energizing motor 26. This operates to maintain a predetermined pressure in the fluid supply line 119 at all times, any excess fluid being recirculated to the reservoir through by-pass connection 28 and relief valve 29. In this manner a predetermined pressure is maintained in the continuous supply groove 106 of valve 68 and the similar supply groove 47 of spool valve 46. When no control pressure is being exerted on spindle 38, stylus 130 rests on the master pattern with its lower peripheral edge against the portion of the pattern corresponding to the area on workpiece 17 desired to be machined, it being assumed that the apparatus has been in operation and that a portion of the workpiece has already been machined. Under these conditions the stylus and spindle will be in the neutral position illustrated in FIGURE 3 wherein all flow to and from the servo-motors is cut off.

Let it now be assumed the operator wishes to advance the cutting tool upwardly to the right along the pattern as viewed in FIGURE 1. In initiating this movement, let it be assumed the operator applies slight pressure to spindle 38 in a direction parallel to the major axes of ports 108 and 109. Since valve plate 68 is constrained to move bodily with the spindle and in the same direction, it will be apparent that land 107 of the valve plate is moved slightly across the outer, longer side of the valve port 114 and across the inner, longer side of port 113. In consequence, high pressure fluid from distributing groove 106 passes into port 114 for flow through conduit 116 leading to the inner end of servo-motor 13. At the same time, fluid from the outer end of servo 13 passes through conduit 115, port 113 and into the return fluid channel 105 connected to the reservoir through return line 120. The resulting supply of pressurized fluid to the inner end of the motor and the bleeding of a like quantity of fluid from the outer end results in the piston of motor 13 being moved by a very slight increment toward its outer end to move bed plate 18 in a direction opposite to that in which the spindle 38 was moved. Under these assumed conditions, ports 108 and 109 remain closed and there is no change in the position of motor 14. Likewise, it is assumed that there was no change in the axial position of the stylus under which conditions both ports of the spool valve remain closed and servo-motor 15 remains locked stationary.

Next, let it be assumed that the rear right corner of the high portion of the pattern as viewed in FIGURE 1 has been reached and that it is desired to advance along the rear edge of this high portion.

The operator would press the stylus-supporting spindle 38 toward the upper left hand corner of FIGURE 1 and in a direction assumed to be parallel to the major axes of elliptical ports 113 and 114. Under these assumed conditions, land 107 will move in a direction allowing pressurized fluid from groove 106 to enter port 108 for flow through conduit 111 to the inner end of servo-motor 14 forcing the piston thereof outwardly and exhausting fluid in the outer end of the motor through conduit 112, port 109 into the drain passage 105 for flow through conduit 120 to the reservoir.

If there is need for movement of cutting tool 20 in a direction other than exactly parallel to the major axes of a pair of the control ports for motors 13 and 14, the normally prevailing condition, then it will be clear from the foregoing that the two pairs of control ports for motors 13, 14 are differentially opened in a direction and in an amount for the proper adjustment of both the bed plate and of motor support 23.

The operation of the spool valve 46 is generally similar to that described for plate valve 68. Thus, assuming that the end of stylus 130 advances over a slight rise in the underlying surface of master pattern 16, a condition which will cause the spindle 38 to be elevated axially to move spool 46 upwardly from its neutral position. This movement allows pressurized fluid from distributing groove 47 of the spool to pass across the lower edge of passage 51 in sleeve 45 for flow through port 54 and conduit 138 to the inner end of servo-motor 15. At the same time the lower edge of passage 52 is opened as control land 50 passes thereabove allowing the identical quantity of fluid to exhaust from the upper end of motor as was supplied under pressure to the lower end of the cylinder, the displaced fluid from the upper end passing through conduit 137 to passage 52 for exhaust into the space below spool 46 and return to the reservoir by way of passage 65 and conduit 121. The described supply of fluid to motor 15 elevates the piston therein along with tool-driving motor 21 and its attached cutting tool 20. Since the master control unit 11 is rigidly supported on the housing of motor 21, it will be clear that master valve unit 11 is elevated along with the cutting tool allowing spindle 38 to return toward its neutral position cutting off the flow of fluid to motor 15 thereby locking it in its new adjusted position.

As will be recognized from the foregoing, a movement of the stylus in a direction involving changes with respect to all three axes of the control will entail simultaneous movement of both movable valve elements and the opening of all three pairs of valve ports, the opening of each pair being proportional to the change relative to the associated control axis.

While the particular servo mechanism and improved master control valve therefor herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A master control valve adapted for use in high-precision servo mechanisms, said control valve comprising a housing having a flat end wall provided with two pairs of fluid ports opening therethrough inwardly of its peripheral edge and with their axes disposed at the corners of a square, a valve plate having a flat surface lying flush against said ported end wall and having a circumscribing land effective barely to bridge both radial edges and close flow simultaneously through all of said ports when in one predetermined position thereof and allowing some flow through both ports of at least one diagonally positioned pair of said ports when moved in the slightest amount to any other position of said valve plate, means for limiting the movement of said plate to a fraction of the width of said ports, means for movably supporting said valve plate within said housing, fluid flow ducts in said housing in communication with said ports, passage means for supplying pressurized fluid to the inner peripheral side of said port control land, and passage means for carrying away fluid from the outer peripheral side of said port control land.

2. A master control valve as defined in claim 1 characterized in the provision of means for constraining said valve plate to movement in a plane parallel to the flat end wall of said valve housing.

3. A master control valve as defined in claim 2 characterized in the provision of anti-friction bearing means for supporting said valve plate for movement in said plane parallel to the valve housing end wall.

4. A master control valve as defined in claim 2 characterized in the provision of anti-friction bearing support means for said valve plate, said bearing support means being positioned on both sides of said valve plate.

5. A master control valve as defined in claim 1 characterized in that said port bridging land of said valve plate comprises a wide surfaced rim extending around the peripheral edge of said valve plate, the sides of said land being parallel to one another in the areas thereof opposite said ports and being spaced apart sufficiently to just bridge the juxtaposed fluid port along each side of said valve plate.

6. A master control valve adapted for use with three dimensional control mechanisms, said valve comprising a housing having a flat end wall provided with fluid ports arranged at the corners of a square, a valve plate having a fluid flow control land held pressed across the open ends of said ports and having a radial width barely effective to close said ports only in one predetermined position thereof and providing for simultaneous flow through each of at least one transversely disposed pair of said ports in any other position of said valve plate, spindle means normal to said valve plate including means for supporting said spindle means for movement transversely said valve plate for actuating the same, and valve means operable by said spindle and closed only when said spindle is precisely in one axial position and being open to at least some fluid flow upon any axial movement of said spindle in either direction from said one axial position, said spindle means being operable to move said valve plate and said valve means either independently or simultaneously in accordance with actuating forces transmitted thereto.

7. A master control valve as defined in claim 6 characterized in the provision of ball bearing means supporting said plate valve for movement in a single plane, and additional anti-friction bearing means supporting said spindle means and restricting the same to movement axially thereof as respects said last mentioned bearing support means.

8. A master control valve as defined in claim 6 characterized in the provision of self-aligning anti-friction bearing means for said valve plate effective to constrain movement of said valve plate to a plane parallel to the end wall of said valve housing.

9. A master control valve as defined in claim 6 characterized in the provision of ball bearing means permitting said valve plate to move radially in any direction with respect to a common center for all of said ports while preventing rotation of said valve plate in either direction about an axis extending through said common center normal to the bottom wall of said valve housing.

10. A master control valve as defined in claim 9 characterized in that said ball bearing means comprises radially disposed aligned pairs of rows of anti-friction bearings, one aligned pair of rows being disposed at right angles to the second aligned pair of rows, the anti-friction elements in one of said pair of rows being seated in groove means carried by said valve plate and the anti-friction elements in the other pair of rows being seated in groove means held against rotation relative to the bottom wall of said valve housing.

11. A master control valve for use in a tracer mechanism comprising a cup-shaped housing having a flat interior bottom provided with ports opening inwardly therethrough and accurately centered at the corners of a square, said ports being substantially identical and having a generally elliptical contour with the major axis of one pair at right angles to the major axis of the other pair, a generally square flat surfaced valve plate supported against said bottom wall, said plate having a continuous port control land extending along its peripheral edge of a radial width substantially identical with the width of said ports and barely effective to close all of said ports only when said plate is precisely in one position thereof whereby said land is adapted to control flow in opposite directions through at least one pair of said ports upon movement of said valve plate away from the said one closed position thereof by the slightest distance, said plate being relieved on either side of said land, and means for supplying pressurized fluid to the inner relieved side of said land for flow into any one of said ports upon movement of the plate in a direction to open any port along the inner edge of said land, and means for draining liquid away from the outer peripheral edge of said valve plate including fluid escaping from any one of said ports when opened with respect to the outer edge of said land.

12. A master control valve as defined in claim 11 including rigid means projecting normally from said valve plate and responsive to pressure applied laterally thereto to move said valve plate in any direction within a plane parallel to the bottom wall of said valve housing.

13. A master control valve as defined in claim 11 including actuating spindle means projecting through an opening centrally of said valve plate with its axis normal thereto, said spindle having a close sliding fit with said opening, and bearing means supporting said spindle for movement in a direction axially of said spindle.

14. In a master control valve of the type having a housing and a flow control member movably supported therein for movement in any planar direction, said plate having land means on one surface thereof cooperable with pairs of juxtaposed fluid ports in the wall of the valve housing and equally spaced from one another along a circle through the axes of said ports, that improvement which comprises anti-friction bearing means supporting said plate in close sliding engagement with the adjacent ends of said ports, said bearing means including guide means arranged in superimposed planes parallel to said valve plate and including interfitting means in one plane providing for to-and-fro transverse movement of said plate with respect to said valve housing in one direction, and interfitting means in the other of said planes providing for two-and-fro transverse movement of said plate with respect to said valve housing in a second direction at right angles to said first mentioned interfitting means.

15. In a master control valve as defined in claim 14 that improvement which comprises an actuating spindle for said valve plate, means supporting said spindle for axial movement in a direction normal to said plate and centrally thereof, the permitted movement of said spindle being free of interference with limited movement of said plate relative to said housing, said bearing means and the associated guide means being cooperable to control transverse movement of said valve plate.

16. A master control valve mechanism for use in three dimensional control systems comprising a valve housing, means supporting an actuating spindle for movement axially thereof as well as in any direction in a plane normal thereto, means having pairs of fluid ports disposed in said plane and on axes at right angles to one another passing through said spindle axis, means having a pair of fluid ports disposed in planes parallel to the axis of said spindle, single movable control means for controlling flow simultaneously in opposite directions through at least one pair of said first mentioned pairs of ports in response to bodily movement of said spindle in a direction laterally of and normal to its axis, and a movable control means operatively associated with said pair of fluid ports and responsive to axial movement of said spindle to control the direction of fluid flow therethrough, said spindle having means operable to move both said control means either independently or simultaneously in accordance with actuating forces transmitted thereto.

17. A master control valve as defined in claim 16 characterized in that said means provided with the last mentioned pair of valve ports includes a bore co-axially of said spindle, pairs of grooves formed in the side wall of said bore lying parallel to one another in planes through said spindle inclined slightly with respect to a plane normal to the spindle axis, a spool valve in said bore having an annular groove between the opposite ends thereof, fluid passage means extending from said pairs of grooves, pressurized fluid supply means communicating with said spool valve groove, said spool valve groove being so disposed relative to the grooves in said bore walls that flow to the bore wall grooves is blocked by said valve in one position thereof but occurs to one or the other of said bore wall grooves upon the slightest movement of said piston away from said one position in response to the axial movement of said actuating spindle, the groove to which flow occurs depending upon the direction of spindle movement.

18. A master control valve for use in three dimensional control systems, said valve comprising a housing enclosing means including a single movable valve member arranged to control the direction of flow through each of two pairs of ports opening through a common plane with the axes of the respective pairs lying in planes at right angles to one another, an actuating spindle having a close sliding fit in an opening through said movable valve member centrally between said pairs of ports, means movably supporting said valve member and spindle within said housing and effective to restrict movement of said single valve member within a predetermined plane and allowing said spindle to move bodily with said movable valve member as well as transversely through said valve member and axially of said spindle, and flow control means operatively associated with said spindle and responsive to axial movement thereof to change the position of said flow control means and effective in cooperation with said single valve member to control the direction of fluid flow through the ports controlled thereby, said spindle having means operable to move said valve member and said flow control means either independently or simultaneously in accordance with actuating forces transmitted thereto.

19. A master control valve as defined in claim 18 characterized in that said flow control means includes a spool valve element having a pair of flow control lands separated by a fluid supply groove substantially encircling said spool, said valve housing having slot-like fluid ports opposite said spool lands and lying in parallel planes inclined slightly relative to a plane normal to the axis of said spool and so related to said spool lands that when said spool is in a predetermined neutral position said inclined slots are barely bridged by the juxtaposed land, whereby axial movement of said spool in either direction is effective to open said slots to one side or the other of the associated land.

20. A fluid power control mechanism for accurately controlling the position of three hydraulic cylinder and piston assemblies arranged to move along axes lying at right angles to one another, a master control valve connected in fluid circuit with said assemblies and with a source of pressurized fluid, said control valve including a housing having three pairs of fluid flow control ports arranged at right angles to one another with two pairs of said ports lying in a common plane, a single movable valve member operatively associated to control the direction of fluid flow through said two pairs of ports while confined to movement within a predetermined plane, a second movable valve member operable to control flow through the third pair of said ports, a single bodily movable member interposed between said movable valve members and having means cooperable therewith to move both members either independently or simultaneously in accordance with actuating forces transmitted thereto.

21. A fluid power control mechanism as defined in claim 20 characterized in that said first mentioned movable valve comprises a flat plate movably supported on ball bearings arranged to permit movement of said plate in any straight line lying in a predetermined plane of said plate but preventing arcuate movement of said plate, and further characterized in that said second valve comprises a circumferentially grooved spool valve supported for movement axially across said third pair of ports.

22. A fluid power control mechanism as defined in claim 21 characterized in that said two pairs of flow control ports have non-parallel opposed sides across which said flat plate is movable, said curved sides being cooperable with said flat plate to graduate fluid flow past the port non-linearly as flow is initiated and terminated.

23. In a fluid control valve for use in servo-mechanisms, said valve having a flow control plate supported against a complemental surface having a plurality of flow control ports located in a common plane and opening toward a flow control surface therefor on said flow control plate, means for shifting said plate within a predetermined plane parallel to said ports, and means independent of said plate shifting means for restraining rotary movement of said plate comprising a plurality of interfitting ball and ball race detent means the balls of which are movable only in planes parallel to the common plane of said ports and having their longitudinal axes of movement arranged at right angles and in spaced planes parallel to one another and to said control plate.

24. A master control valve as defined in claim 18 characterized in that said flow control means includes a spool valve movable axially within said housing, said spool valve having a pair of annular lands separated by a fluid supply groove, said housing having elongated slots provided with rectangular interior ports juxtaposed to said lands and adapted to be controlled thereby, said slots being appreciably narrower than said lands with their longitudinal axes lying in a plane inclined slightly to a plane normal to the axis of said spool, the angle of said plane being such that in one predetermined or neutral position of said spool said lands barely bridge the diametrically opposed axially remote edges of the juxtaposed slots whereby slight axial movement of said spool effects the opening of said slotted ports through a portion only of the port length thereby providing for the feathered flow of liquid as the spool recedes from and approaches the neutral position thereof.

References Cited in the file of this patent

UNITED STATES PATENTS

| | | |
|---|---|---|
| 847,326 | Ferris | Mar. 19, 1907 |
| 1,350,438 | Davidson | Aug. 24, 1920 |
| 1,790,168 | Paul | Jan. 27, 1931 |
| 2,433,005 | Turchan | Dec. 23, 1947 |
| 2,448,649 | Adams | Sept. 7, 1948 |
| 2,471,289 | Sedgwick | May 24, 1949 |
| 2,803,095 | La Monica | Aug. 20, 1957 |
| 2,911,182 | Clarke | Nov. 3, 1959 |

FOREIGN PATENTS

| | | |
|---|---|---|
| 783,444 | Great Britain | of 1957 |